July 1, 1958  C. F. FRYE  2,841,174
VALVE
Filed Dec. 14, 1954

INVENTOR
CHARLES F. FRYE

BY *Donald H. Sweet*  ATTY

# United States Patent Office 2,841,174
Patented July 1, 1958

2,841,174
VALVE

Charles F. Frye, Chicago, Ill.

Application December 14, 1954, Serial No. 475,070

5 Claims. (Cl. 137—514.5)

My invention relates to valves and includes among its objects and advantages increased sensitivity and promptness of action in a ball check valve, combined with cheapness of manufacture, and serviceability under a wide range of pressures, including very high pressures. An especial advantage is durability in types of service that include a working life amounting to twenty million or so openings and closings.

Figure 1:
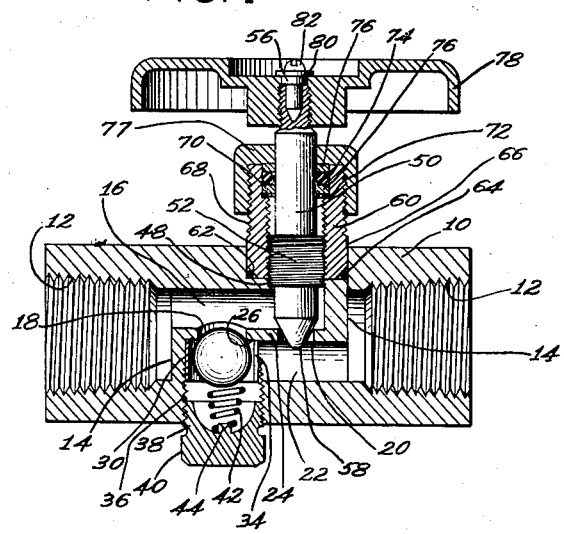
Figure 1 is a longitudinal section of a complete valve according to the invention, on line 1—1 of Figure 2.
Figure 2:
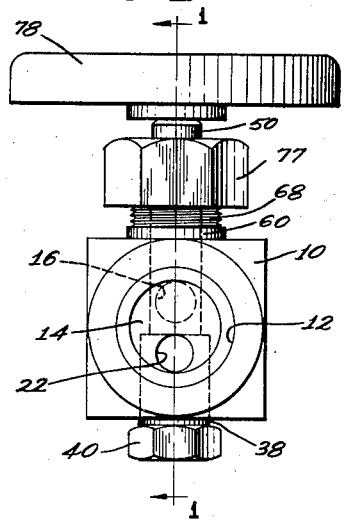
Figure 2 is an end view of the same.

In the embodiment of the invention selected for illustration, the valve has a square main body 10 provided with conventional pipe threads 12 at both ends. The bore for forming the pipe threads extends in at each end a little beyond the end of the threads, ending in a plane end 14. Smaller offset holes parallel to the axis are then drilled, including the left upper bore 16, leading past the check valve opening, or seat, at 18 and ending over the throttle valve opening 20; and the lower right bore 22 extending past under the throttle valve seat, or opening, 20, and ending at the check valve 18. There remains a central partition 24 separating these two passages.

Figure 3:
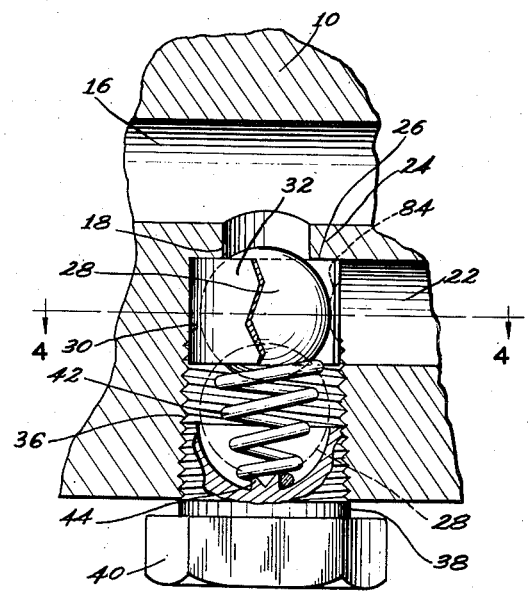
Figure 3 is an enlarged detail section on line 1—1 of Figure 2.

The check valve assembly is completed by drilling in from the bottom at right angles with a stepped drill, which simultaneously finishes the bore of the valve seat 18 and a plane annular shoulder 26 encircling the bore 18, and facing downward to engage the ball 28. The bore 30 below the annular shoulder 26 is made large enough to receive a sleeve 32, generally C-shaped in cross-section and having a lateral opening 34, extending throughout its length and subtending an angle of about eighty degrees. By forming this sleeve, in an undistorted condition, a few thousandths of an inch too large to fit in the bore 30, it is easy to force it into assembled position, and the slight tension developed in it will hold it in place frictionally. The ball 28 is smaller than the inner surface of the sleeve 32, with a diametrical clearance amounting to about ten or fifteen thousandths of an inch. It is indicated in closed position in Figure 1 and in open position in Figure 4. Figure 3 shows the ball in closed position in full lines and in open position in dotted lines.

The dotted-line position of Figure 3 indicates the extreme displacement permitted the ball 28 and it will be noted that the passage for flow of fluid through the valve involves a minimum of displacement and turbulence. The fluid coming down through the valve seat can already be moving at an angle downward and to the right, as seen in Figure 1, and need only curve over into a horizontal direction to pass out through the bore 22. It does not have to find its way around the ball 28, and there are no extreme reductions or enlargements of the cross-sectional area of the flow.

Means are provided for maintaining the ball 28 in contact with its seat. The bore 30 is enlarged and threaded at 36 and receives a cup-shaped retaining plug 38 having a hexagonal head 40. Within the cup 38 I house a spring 42 having coils of progressively increasing diameter, so that it can flatten down to a very short axial dimension. The smallest end coil at the bottom is a friction fit on the receiving tit 44. It will be apparent that the ball can move readily away from the seat a total distance only a trifle less than its own diameter, being limited in maximum downward displacement by engagement with the tit 44, and with the bottomed spring.

I make the spring 42 extremely flexible and under initial tension, in the full-line position of Figure 3, about equal to the weight of the ball. The operating condition is such that if the full-line position leaves a clearance of about five thousandths of an inch between the ball and seat, operating effectiveness is maximum, but that maximum is substantially unimpaired if the spring tension is enough so that it would lift the ball about one-quarter of the ball diameter higher than the seat. This provides desirable tolerance in mass production. The spring is also designed for a slowly increasing tension, such that, in the dotted line position of Figure 3, the spring is only pushing up with a force of about twice the weight of the ball, so that the light impact of a stream of generous volume coming down through the opening will hold the ball all the way down, and the pressure loss in passing through the valve is minimized.

Such a valve is often desired in combination with means for producing a throttled or calibrated flow in the direction in which the ball valve permits no flow. At its right end, the partition 24 defines the throttle valve seat 18. The transverse bore entering at 48 receives a valve stem comprising a central cylindrical portion 50, a large inner threaded end 52, and a non-circular projection at 56 for adjustment purposes.

The valve member proper at 58 is shaped to fit the seat 18. The threads 52 are received in and supported by the sleeve 60. The sleeve 60 is originally formed with an external bevel at 62 and is a press fit in the body 10. Before it is pushed in place, a copper ring 64 is laid in place, and after the sleeve is put in, the unit is copper brazed by positioning additional metal at the crotch 66 and heating the entire unit in a carbon dioxide atmosphere above the melting point of copper, so that the ring 64 fuses and lines the cavity. This provides a seal that is durable and has ample margin of safety even for hydraulic pressures of the order of magnitude of several thousand pounds per square inch.

The sleeve 60 is externally threaded at 68 and counterbored at 70 to receive a bottom metal washer 72 and an O-ring 74 of neoprene or similar rubbery material. The ring 74 is confined between duplicate plastic washers 76, clamped down by the cap 77, to insure maximum sealing efficiency. The squared shank 56 receives a conventional hand-wheel 78 fastened on by a washer 80 and a screw 82.

Figure 4:
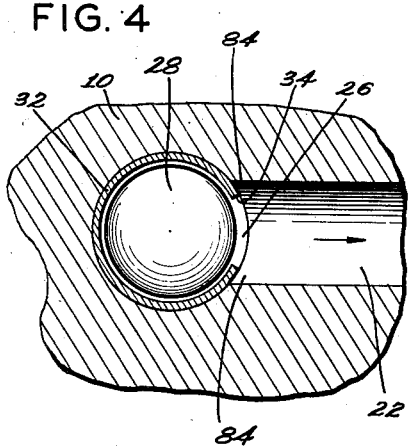
Figure 4 is a section on line 4—4 of Figure 3, with the valve open.

The relative proportions and configuration illustrated in Figures 3 and 4 are believed to be critical. An interesting advantage developed by actual experience is complete freedom from chattering or hammering under a wide variety of conditions of service; a minimum pressure drop and maximum discharge rate even when operating on very small pressures, and durability in operation several thousand times daily for many years.

Referring especially to Figures 3 and 4, the fluid coming in through the passage 16 must turn downwardly through the check valve opening 18 and then turn horizontal again to pass on through the opening 34. At midheight of the exit passage 22 the sides of the opening 34 extend in to define small pockets 84, but these pockets extend vertically only about half the diameter of the exit passage, as indicated in dotted lines in Figure 3. This generates a very minor turbulence at the entrance of the passage 22, which turbulence tends to scavenge the passage of even the tiniest piece of dirt.

At the same time the stream moving downwardly through the seat 18 encounters a dead-end substantially obstructed by the top of the ball 28, which presents a rounded dome against which relatively light impact with only slight turbulence is adequate to deflect the gases and start them along the passage 22.

This relatively gentle handling of the gases is combined with the positive abutment of the ball against the tit 44 and the smooth interior guide surface of the sleeve 32, to house the ball in cup-like engagement with all the turns of the spring 42. Thus, any tendency of the ball to oscillate from side to side, or chatter, would be limited to a few thousandths of an inch allowed by the clearance of the sleeve 32.

It is my belief that in the lowered dotted-line position the ball finds itself under pressure at the top by a fluid cap that has a minimum velocity around its own periphery, and therefore, has a dynamic action tending to hold the ball centered. Whether this is correct or not, the complete absence of chattering in handling various gases at working pressures from five to five-hundred pounds per square inch, and liquids at working pressures from about twenty to about five-thousand pounds per square inch, is an observed fact.

Such a valve also returns its ball to the seat with relatively negligible impact under the entire range of service conditions. Because of the sleeve guide, as the ball approaches the seat, it cannot be off center, with respect to the axis of the seat, more than a maximum of 7½ thousandths of an inch, so that it never hits the seat with initial contact over such a short line of contact that there is any effective hammering action by which the ball tends to deform the seat. The lower edge of the seat, where it engages the ball, is chamfered to define an annular portion of a 45-degree cone, and the face of this annular conical portion is from ten to fifteen thousandths of an inch wide.

The force of the spring 42 is negligible compared with the pressure differences in the fluid handled by the valve. With the valve seat 18 one-half inch in diameter and the ball 28 five-eighths inch in diameter, the weight of the ball, distributed over the cross-sectional area of the valve seat, represents a pressure amounting to only a fraction of one pound per square inch. Thus, if the valve is mounted the other side up, contrary to instructions, the pressure difference necessary to push the ball up would still be approximately one or one and one-half pounds per square inch.

As a specific example, assume such a valve in service to deliver air at fifty pounds gauge to an operating cylinder three inches in diameter with a six-inch stroke; during the working stroke the velocity action of the flow holds the ball steadily in the dotted-line position of Figure 3. But at the instant that the stroke ends and the working pressure in the cylinder rises to the same value as the source of supply, the diminution of the flow lets the ball 28 start up, so that at the instant the flow ceases the ball 28 will be substantially at the full-line position. If, at this time, the passage 16 is suddenly vented to atmosphere, a mechanical load of the order of magnitude of one-hundred times the weight of the ball is generated to hold the ball on its seat. The significant consideration is believed to be that this one-hundred fold load comes into existence only after the ball is on the seat, or within one-thousandth of an inch or so from the seat.

These are believed to be the critical characteristics that have resulted in outstanding service records for the valve disclosed. So far as I am aware, the valves of the prior art employed springs from ten to one-hundred times as stiff and with initial tensions proportionately larger than I employ. They also, in most instances, require the stream coming in through the valve seat to spread out into an annular stream and pass around the ball.

Especially at high rates of flow, this not only introduces from ten to one-hundred times as much loss of pressure in flowing through, but it imposes from ten to one-hundred times as much mechanical force on the ball itself, and the clearance that is indispensable to let such an annular stream get around the ball makes it necessary to deprive the ball of the smooth guidance provided by the sleeve 32.

Others may readily adapt the invention for use under various conditions of service by employing one or more of the novel features involved or equivalents thereof. For instance, using compressed air at a low pressure to actuate a small device where the complete cycle of operations occurs oftener than about one hundred twenty times a minute, it would be necessary to employ a rather large valve for quick filling and emptying, and the spring for the ball should be designed for more prompt return to closed position. In such an installation the spring should still just support the weight of the ball when the ball is on its seat, but an increase of about forty percent in the diameter of the wire in the spring increases the stiffness more than two and one-half times, so that when the valve is wide open, the spring pressure is three or four times the weight of the ball, and the ball will start back more quickly when the flow diminishes. But even under this condition there will be no appreciable hammering of the ball on the seat. During the interval of two or three- hundredths of a second that corresponds to the final portion of the cessation of flow, the ball will be back within twenty or thirty-thousandths of an inch of the seat and will be cushioned at that point by the momentary residual air pressure, to prevent any heavy impact on the seat. The additional spring force is only required at the beginning of the return movement because the cessation is so abrupt that the lower half of the return movement of the ball would not be quick enough to keep up with the air pressure change.

This application is a continuation in part of my copending application S. N. 83,919, filed March 28, 1949, and now abandoned.

As at present advised, with respect to the apparent scope of my invention, I desire to claim the following subject matter 1. A check valve for conveying power fluid at high velocity comprising: a valve body having a bore therein; a seat at one end of said bore; an inlet passage through said seat; a lateral discharge port in said bore; a ball axially movable in said bore to and from said seat and past said discharge port; said bore having a longitudinally extending slot adjacent said discharge port, said slot having straight parallel side guide edges for guiding said ball past said discharge port; said bore encircling said ball with minimum mechanical clearance only, of the order of magnitude of from 10 to 15 thousandths of an inch; whereby when said ball is lifted from its seat, the issuing stream cannot get behind said ball, and pushes said ball forcibly away, beyond said discharge port.

2. A valve according to claim 1 in which said guide edges and a portion of said bore adjacent said discharge port are defined by a C-shaped liner inserted in said body; said edges being separated by a distance less than the diameter of said discharge port.

3. A valve according to claim 2 in which said liner, in unstressed condition, would be too large to fit in said bore; said liner being resiliently contracted and remaining in said bore in stressed condition.

4. A valve according to claim 1 in combination with a light spring normally pressing said ball toward said seat.

5. A valve according to claim 4 in which said spring exerts a force not greater than about the weight of said ball, when said ball is on its seat.

References Cited in the file of this patent

UNITED STATES PATENTS

| | | | |
|---|---|---|---|
| 1,013,695 | Storer | Jan. 2, | 1912 |
| 1,173,536 | Phillips | Feb. 29, | 1916 |
| 1,305,964 | Dickson | June 3, | 1919 |
| 1,530,317 | Oamka | Mar. 17, | 1925 |
| 1,558,064 | Thrift | Oct. 20, | 1925 |
| 1,642,724 | Fleming | Sept. 20, | 1927 |
| 1,757,059 | Rickenberg | May 6, | 1930 |
| 2,319,604 | Hennessy | May 18, | 1943 |
| 2,386,794 | Hennessy | Oct. 16, | 1945 |
| 2,415,258 | Parker | Feb. 4, | 1947 |
| 2,470,372 | Roth | May 17, | 1949 |
| 2,497,354 | Hackathorn | Feb. 14, | 1950 |
| 2,558,687 | Krueger | June 26, | 1951 |
| 2,646,959 | Carver | July 28, | 1953 |

FOREIGN PATENTS

| | | | |
|---|---|---|---|
| 15,709 | Great Britain | July 11, | 1906 |
| 890,630 | France | Nov. 8, | 1943 |